Figure 3:
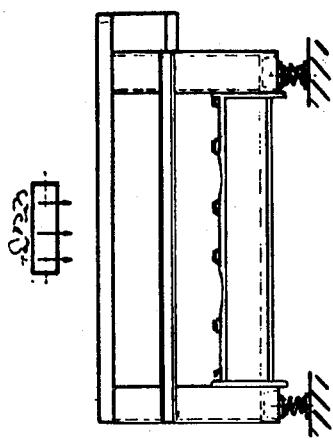

United States Patent [19]
Wehner

[11] 3,971,715
[45] July 27, 1976

[54] DEVICE FOR SIEVING, SORTING, FILTERING AND THE LIKE

[76] Inventor: Albert Wehner, Haus 35, Wieladingen, D-7881 Willaringen 2, Germany

[22] Filed: Mar. 10, 1975

[21] Appl. No.: 557,091

Related U.S. Application Data

[63] Continuation of Ser. No. 336,395, Feb. 27, 1973, abandoned.

[52] U.S. Cl. ................................ 209/310; 209/396
[51] Int. Cl.² ........................................... B07B 1/28
[58] Field of Search ........... 209/396, 310, 360, 361, 209/240, 325; 198/1

[56] References Cited
UNITED STATES PATENTS

| 368,915 | 8/1887 | Foran | 209/396 X |
|---|---|---|---|
| 721,421 | 2/1903 | Carnochan | 209/396 |
| 1,609,198 | 11/1926 | Izapp | 209/396 |
| 1,707,251 | 4/1929 | Cederquist | 209/396 X |
| 3,021,953 | 2/1962 | Brastad | 209/240 X |
| 3,208,594 | 9/1965 | Wehner | 209/396 X |
| 3,455,453 | 7/1969 | Hill | 209/396 |
| 3,589,521 | 7/1971 | Richter | 209/380 X |
| 3,633,745 | 1/1972 | Wehner | 209/310 |
| 3,647,068 | 3/1972 | Wehner | 209/310 |
| 3,770,125 | 11/1973 | Schober | 209/360 |

FOREIGN PATENTS OR APPLICATIONS

| 1,451 | 1/1898 | Denmark | 209/310 |
|---|---|---|---|
| 711,608 | 9/1931 | France | 209/396 |
| 184,213 | 5/1906 | Germany | 209/396 |
| 1,161,211 | 1/1964 | Germany | 198/1 |
| 201,204 | 10/1967 | U.S.S.R. | 198/1 |

Primary Examiner—Robert Halper
Attorney, Agent, or Firm—Richards & Geier

[57] ABSTRACT

A device for sieving, sorting, filtering and the like, comprising two frame systems movable relatively to each other, each frame system comprising a number of carriers extending in the sieving direction and moving parallel to one another, said frame systems interengaging in such a way that one carrier of one system is always adjacent within a certain distance to one carrier of the other system. Due to the fact that on each pair of adjacent carriers of the two systems there is attached a pair of flexible material mats, said pair of mats consisting of one perforated and one unperforated mat, and that said carriers are moved successively towards and away from each other by the relative motion of said frame systems, there are formed zones of continously changing width at an alternately deep sag of the bottom mats of said mat pairs and at a simultaneously differently large arching of the top mats of said mat pairs, as well as with the top and bottom mats of said mat pairs extending in a tensioned, momentarily overstretched position parallel to each other, which results in the formation of hose- or channel-shaped sorting decks, said sorting decks exerting, owing to their continuously changing cross-section, a pressure or suction effect on the goods to be sieved, sorted or filtered. In spite of the fact that the carriers perform a swinging motion transversal to their longitudinal stretch, a surprising effect of the device according to the invention lies in the fact that the sieving, sorting or filtering goods fed into the hose- or channel-shaped sorting zones of the inclined mounted device are transported in the direction of the longitudinal stretch.

7 Claims, 15 Drawing Figures

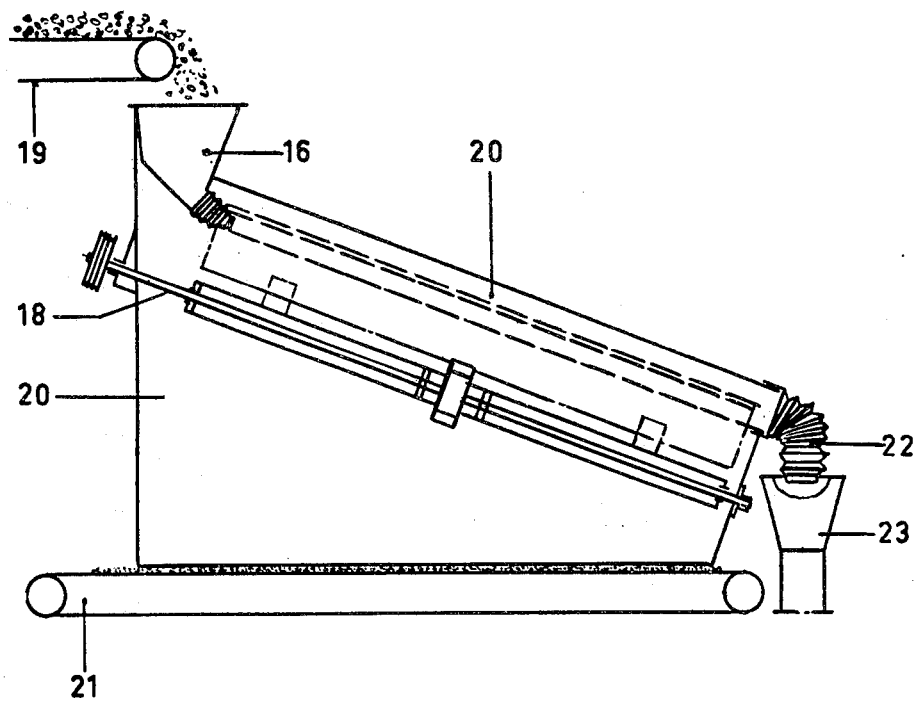
Fig. 9
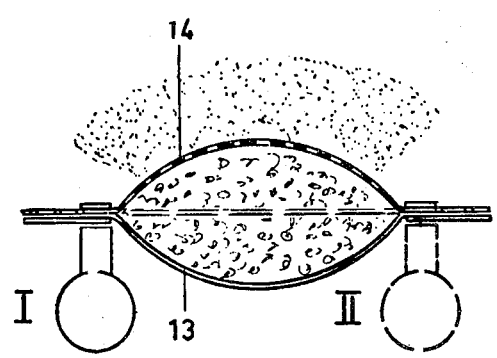
Fig. 10
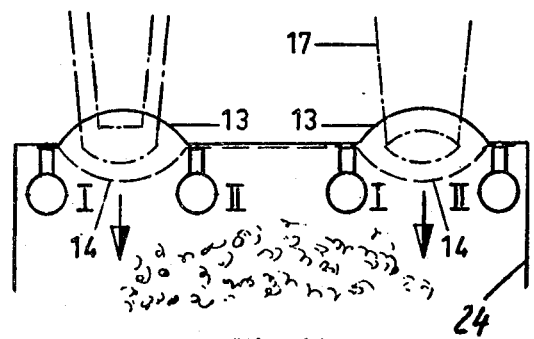
Fig. 11
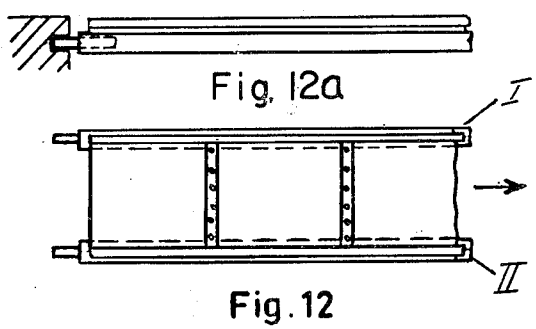
Fig. 12a
Fig. 12
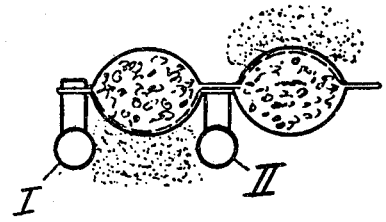
Fig. 13

DEVICE FOR SIEVING, SORTING, FILTERING AND THE LIKE

This application is a continuation of a copending patent application Ser. No. 336,395 filed Feb. 27, 1973, now abandoned.

The invention refers to a device for sieving, sorting, filtering and the like.

U.S. Pat. No. 3,647,068 describes a screening mechanism which includes two systems of screen-carrying members, the two systems, in static condition thereof, extending in substantially the same horizontal plane, carrying members which are spaced from one another in a given direction and substantially in transverse alignment with one another in a given direction, the carrying members of one system being in respective alternate arrangement with the carrying members of the others system; a screening member comprises a web, at least partly deformable by gravity, carried by the carrying members, each of the carrying members of one of the systems being connected by the screening member to the carrying members of the other system adjacent thereto; there are means for relatively moving the two systems in the given direction, whereby the spacing between the adjacent carrying members is continually varied in the dynamic condition of the systems, and the screening members is deformed in accordance with the varied spacing between the carrying members.

Also U.S. Pat. No. 3,633,745 describes a screening machine which comprises a frame, a flexible screen attached at intervals to parallel screen floor supports which are fixed on supporting tubes rotatably mounted in bearings in the frame, so that the screen floor supports can rock about the fixed axes of the supporting tubes, and a driving mechanism for oscillating the supporting tubes and hence the screen floor supports about their axes in such a way that adjacent supports alternately approach on recede from each other in order to flex and stretch alternately the screen floor between them, thus setting up a stationary wave in the screen floor.

In this sieving machine, the sieving goods are transported preferentially transversally to the center line of the tilting carriers between the side jaws or side walls, which are in this case always at rest. Since individual zones of the sieving mats of the elastic and flexible sieving bottom are tensioned, momentarily overstretched and released again in a rapid succession, there results, particularly in fine sieving processes, a sealing problem on the lateral sieving box walls, which requires measures involving special, also elastic sieving bottom parts or structural parts, which however, up to now could not yield satisfactory results.

Furthermore, due to the multiple supporting points, the described sieving machine is extremely susceptible to trouble, and this is, in turn, particularly disadvantageous in the handling of dust-raising goods and consequently requires a large amount of maintenance work. This is also the reason why it was not possible to confirm the extremely favourable effect of the above described characteristical sieving bottom motion from the point of view of sieving efficiency, loosening of the sieving goods, separating result and freedom from clogging of the sieving bottom except in few fields of application.

An object of the present invention is to improve the teaching of prior art in a manner which would enable the use of the characteristic sieving bottom motion in additional fields of fine sieving, filtering and sorting. At the same time, the present invention results in a mechanical device, the operation of which is to a large extent maintenance-free and which does not have the afore-described disadvantages.

This invention attains these objects by providing that the two systems of the device movable relatively to each other are interengaged in such a way, that the carriers alternately associated to the two systems are arranged with their longitudinal stretch in the sieving direction, one pair of mats being made of elastic material and comprising at least one top and one bottom mat attached to two adjacent carriers each of both systems, said pair of mats being deformed, owing to the relative motion of the carriers, in a rapid succession, so that each pair of mats forms a zone of continuously changing width with an alternately deep sag of the bottom mat at a simultaneously differently large arching of the top mat, as well as with the top and bottom mats of said mat pairs extending in a tensioned, momentarily overstretched position parallel to one another, which results in the formation of hose- or channel-shaped sorting zones, said sorting zones exerting, owing to their continuously changing cross-section, a pressure or suction effect on the goods to be sieved, sorted or filtered. In this construction, the special, lateral sealing of the type previously required is eliminated by loosely tensioning smooth, plain rubber or plastic covers to the external carriers and the sidewalls of the device. Similarly, the rubber or plastic covers may be replaced by bendable metal or hard plastic plates, said plates being flexibly jointed over elastic intermediate members to the carriers and side walls, if required.

Although the carriers of both systems perform a relative swinging motion directed transversally to their longitudinal stretch, an unobjectionable transport of the treated sieving goods in the direction of the longitudinal stretch of the carriers is assured since the device according to the invention is mounted in an inclined position, depending on the nature of the charging material, so that the tensioning and momentary overstretching of the bottom mat of a pair of mats results in the tossed-up particles of material falling down by gravity upon the bottom mat over an arched path directed towards the discharge end of the hose- or channel-shaped sorting zone. Since the tensioning of the top mat of the mat pair takes place, however, simultaneously with the tensioning of the bottom mat, the normally arched path of the tossed-up particles of material is deflected by the top mat at such a sharp angle in the direction of the bottom mat that the individual particles of the material reach at least twice more frequently the bottom mat than it would be the case with a normal development of the trajectory of the particles of material. This results in an important improvement of the sorting effect due to the reduction of small particles of material in the overflow.

Furthermore, according to the principles of the present invention, it is possible to arrange several perforated mats spaced and superposed and obtain thus a multiple sorting effect. Similarly, it is possible to drive the two carrier systems with a shifting of 180° or to stop one of the two carrier systems. It is also possible, for example, to impress to the top mat of a mat pair a permanently efficient convex arched position which is maintained even in the largest distance position of the carriers of both systems which form a zone; in this way it is possible to obtain a sieving, sorting, filtering machine and the like with an extremely low construction height. Moreover it is possible to arrange several perforated and unperforated mats superposed within a zone in such a way that each unperforated mat serves as cover element of the bottom perforated mat and simultaneously also as a transporting blind bottom for the superposed perforated mat.

Furthermore, the two interengaged systems can be driven, so that the carriers associated with said systems carry out a linear, circular or partially circular or a simple tilting or swinging motion; the only important feature is that the adjacent carriers of the two systems must be moved in a continuous alternation towards and away from each other and form between them a slot of continuously changing width.

In the process of the present invention, the two systems should be driven preferably so that particularly the perforated mats are overstretched momentarily upon attainment of their stretched length in such a manner that the solid matter possibly adhering to the perforated mats is blown off or that the particles of material possibly clamped in the individual sieve holes fall out of the sieve holes due to the momentary enlargement of said sieve holes, thereby ensuring an absolute freedom from clogging of the perforated mats.

In addition to the possibilities described above, it is possible according to the present invention to obtain also a simple sieving machine with sorting channels formed in the longitudinal direction of the carriers, in which the function of the perforated mat is assumed by a cover frame, the cover frame being divided preferably into partial surfaces.

The invention will appear more clearly from the following detailed description when taken in connection with the accompanying drawings showing by way of example only a preferred embodiment of the inventive idea.

Figure 4:
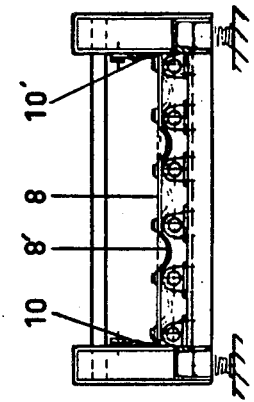
Figure 1:
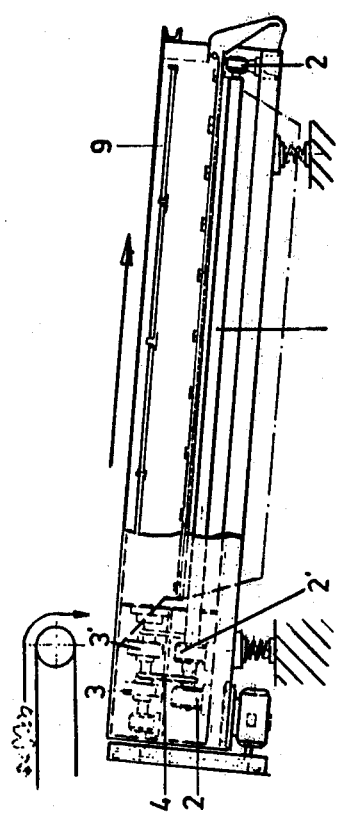
Figure 2:
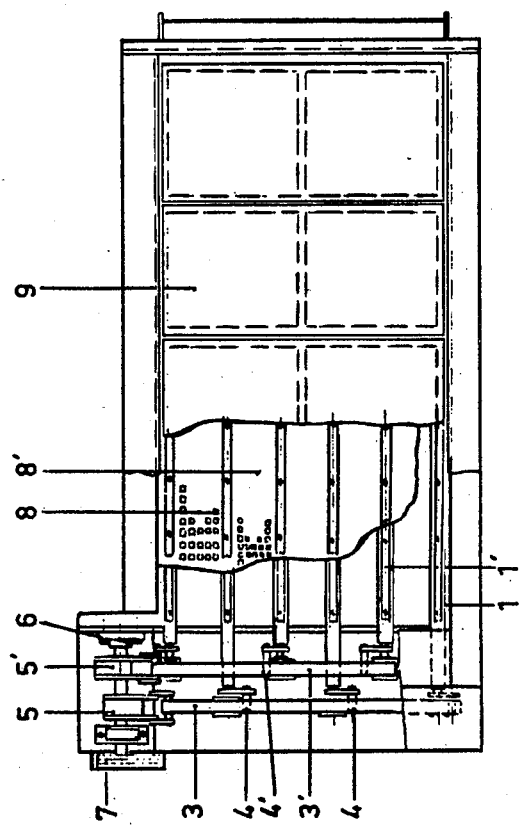
Figure 5:
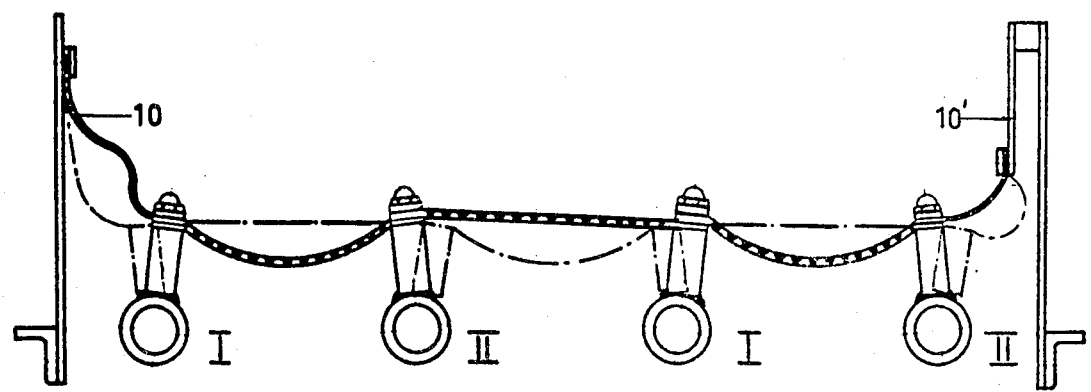
Figure 6:
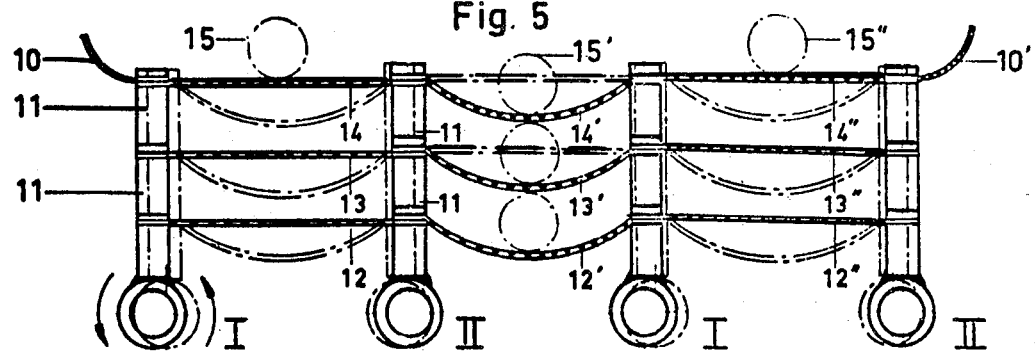
Figure 6A:
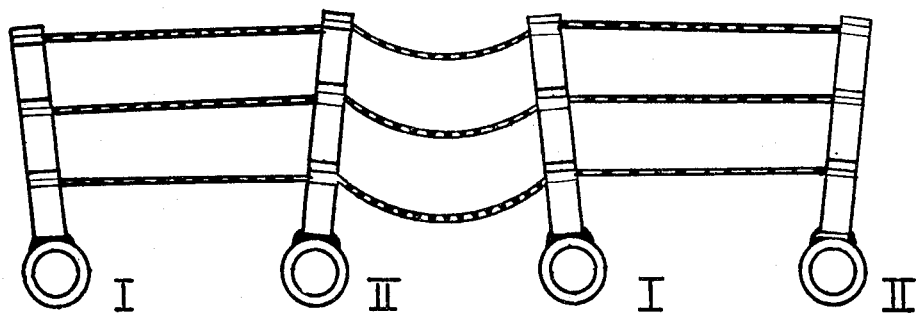
Figure 7:
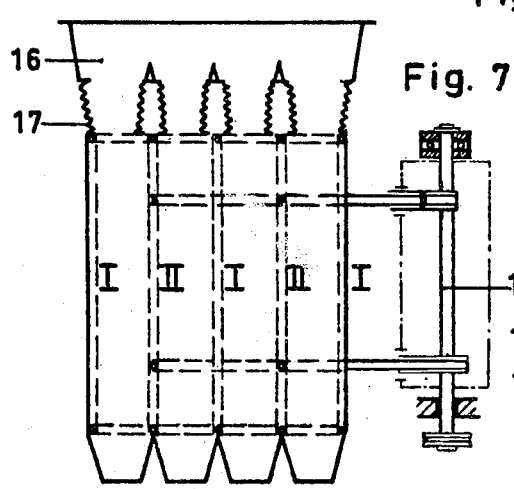
Figure 8:
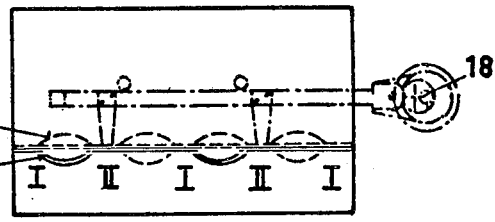

In the drawings:

FIG. 1 shows a sieving machine according to the present invention;
FIG. 2 is the top view of FIG. 1;
FIG. 3 is the side view to FIG. 1;
FIG. 4 is a section through the sieving machine of FIG. 1;
FIG. 5 is a section of FIG. 4 on a larger scale;
FIG. 6 shows the construction for multiple sorting;
FIG. 6a is similar to FIG. 6;
FIG. 7 shows a general arrangement with hose-shaped zones;
FIG. 8 is the top view to FIG. 7;
FIG. 9 is a side view to FIG. 7;
FIGS. 10, 11 the section of a hose-shaped zone,
FIG. 12 the division into sections of a mat extending in the longitudinal direction of the carriers;
FIG. 12a is a side view of FIG. 12;
FIG. 13 the cross-section through two hose-shaped zones.

FIGS. 1 to 3 illustrate the design according to the present invention of a sieving machine, which comprises two interengaged frame systems, each of said systems comprising a number of carriers stretched in the sieving direction and moving with a parallel spacing relatively to each other. One carrier 1 of system I is always adjacent at a parallel spacing to a carrier 1' of system II so that the adjacent carriers 1, 1' form slots of continuously changing width owing to the swinging motion resulted transversally to their longitudinal stretch. To this end, the carriers 1 are moved over a swinging lever 4 by a driving rod 3, whereas the carriers 1' are moved over the swinging lever 4' by the driving rod 3', said carriers 1, swinging levers 4 and driving rod 3 representing the moving system I, and said carriers 1', swinging levers 4' and driving rod 3' forming the moving system II. The two moving systems I, II are driven over a common crankshaft 6, members 5, 5'' mounted on said crankshaft actuating the associated systems 1, 11 in a swinging motion with a shifting of 180°.

Elastic or flexible sieving mats 8, 8' are fastened to the carriers 1, 1'; due to the relative motion of carriers 1, 1' said sieving mats form adjacent zones of continuously changing with an alternately differently deep sag curved arching or different tensioning of sieving mats 8, 8', the relative motion of carriers 1, 1' being of such a magnitude that said sieving mats 8, 8' are momentarily overstretched upon attainment of their stretched length, which results in a momentary crosssecrional increase of the sieve holes and this guarantees, in turn, the release of possibly clamped near-mesh material and an absolute freedom from clogging. Thus, mats 8, 8' fastened to carriers 1, 1' form sieving channels extending in the longitudinal direction of carriers 1, 1' and limited laterally by said carriers. This makes it possible to use instead of several narrow and long sieving mats 8, 8' a single continuous elastic or flexible sieve bottom extending over the whole width and length, which is then attached zone-like to the individual carriers 1, 1' by means of gibs.

Although carriers 1, 1' of the two systems 1, 11 perform a swinging motion transverse to their longitudinal stretch and with a shifting of 180°, an unobjectionable transport of the sieving goods to be treated is assured over the whole length of the sieving channels extending in the sieving direction, since the machine according to the present invention is mounted in an inclined position, so that during the tensioning and momentary overstretching of sieving mats 8, 8' tossed-up particles of sieving material fall on sieving mats 8, 8' over an arched path directed toward the discharge and, are tossed up again and fall then anew over an arched path on sieving mats 8, 8'. However, in order to attain a higher sorting efficiency, a cover frame 9 made up of several sections is provided at a certain distance over sieving mats 8, 8', this distance to sieving mats 8, 8' being sized to ensure that upon tensioning of sieving mats 8, 8' the tossed-up particles of sieving material will be bound against the cover frame 9 in such a way that the particles of sieving material are deflected at a sharp angle from their normal arched path and fed to the sieving mats. This results in the particles of sieving material being brought on the sieving mats 8, 8' much more often than it would be the case under normal conditions. In this way, a substantial improvement of the sorting efficiency is attained by reducing the amount of fine particles in the overflow.

The sectional representation in FIGS. 4 and 5 illustrate the formation of sieving channels as a function of the position of carriers 1, 1' relative to each other, on the one hand, and the trouble-free lateral sealing effect, on the other hand. It is thus evident that during the first motion phase, which corresponds to one half of the motion cycle, mats 8 are, for instance, in a tensioned position, whereas the adjacent mats 8' assume a concave sagging position. During the second motion phase, the previously sagging mats 8' are tensioned, while the adjacent mats 8 assume a concave sagging position.

FIGS. 4 and 5 show, furthermore, the trouble-free side seals 10, 10' which can be achieved, for example, by means of plain rubber or plastic covers loosely tensioned to the outwardly extending carriers or the side walls of the sieving machines, as illustrated by 10. Similarly as is illustrated by 10', it is possible to use bendable metal or hard plastic plates which may be attached, if required, over intermediate pieces to the outwardly extending carriers and/or the side walls of the sieving machine.

FIGS. 6 and 6a show the advantageous application of the sieving machine according to the present invention for a multiple sorting process or for increasing the sieving efficiency by means of several decks. Thus, for example, in the left-hand longitudinal zone of FIG. 6 an perforated mat 13 is arranged spaced by means of intermediate pieces 11 over a bottom perforated mat 12, the perforated mat 13 being uncovered in turn by a sieving mat 14 spaced again by means of intermediate pieces 11. In this way, it is possible to carry out simultaneously two similar sieving or sorting operations in a zone limited by two adjacent carriers of system 1, 11, the central perforated mat 13 serving as transport mat for the sieving or sorting material which has passed through mat 14, on the one hand, and at the same time as bouncing mat for the particles of sieving or sorting material tossed up by the bottom mat 12, on the other hand. The increase in efficiency attainable in this way is evident.

In the central zone, these mats 12', 13' and 14' with differently large sieve holes are arranged superposed and spaced by means of intermediate pieces 11, the mats separating the material charged on the top mat 14' into four fractions; the same applies to the right-hand zone.

If contrary to the representation, the top mat 14'' of the right-hand zone is an unperforated mat and the material to be treated is charged on the central, perforated mat 13'', it is possible to carry out a dust-free sieving or sorting of the material into three fractions.

It is apparent that in one zone either only perforated mats, or perforated and unperforated mats can be used, depending upon the intended use.

As has been already mentioned, the carriers of systems 1, 11 can be moved in this case also linearly or on a circular or partial circular path or they can carry out a rotary-tilting motion, depending on the type of sieving machine adopted.

FIG. 7 shows a solution, wherein the charging of the individual hose- or chamber-shaped sieving zones is made out of a general hopper 16 over nozzle-like folded bellows 17, with the possibility of installing the corresponding device in an inclined or vertical position. FIG. 8 which is a top view of the device in FIG. 7, illustrates an additional principle of the present invention, which is based on the knowledge that, in case of various goods being treated by sieving, sorting and filtering techniques, it is advantageous to exert a pressure or suction effect on the material to be sieved, sorted or filtered. To this end, the present invention proposes to associate a pair of mats made up of a bottom mat 12''' and a top mat 13''' to the zone formed by two adjacent carriers of systems 1, 11, and to pre-shape or pre-tension said mats 12''', 13''', if required, in such a way that in the closest distance position of the carriers of systems 1, 11 which define a zone, the bottom mat 12''' assumes a concave sagging, and simultaneously the top mat 13''' assumes a convex arched position, whereas in the largest distance position of the carriers relative to each other, both mats 12''' and 13''' assume a tensioned, momentarily overstretched, parallel position relatively to each other. In this way, a hose-like sorting zone is formed which, as a result of the continuous change in its cross-section, exerts a pressure or suction effect on the material to be treated. In this process, the suction effect exerted on the material to be treated can be intensified by producing and maintaining a certain underpressure in the treated material receiving container, as shown in FIGS. 10 and 11. It will be noticed that by means of a drive, e.g. excenter shaft 18, it is possible to actuate either only one of the systems 1 or 11 or both systems 1 and 11.

FIG. 9 shows a lateral view of a device according to FIGS. 7 and 8, in which the material to be sieved, sorted or filtered is fed over conveyor band 19 into hopper 16 and from there into the hose-shaped sorting zones, which are actuated by excenter shaft 18. The treated material is discharged over hopper 20 on the collecting band, whereas the overflow material is conveyed via the overflow hoses 22 to the collecting container 23.

The hose-shaped sorting zones resulting from the devices shown in FIGS. 7 and 8 are represented again in detail in FIGS. 10, 11 and 13. While according to FIG. 10 the top mat 14 is perforated and the bottom mat 13 is an unperforated pressure mat, in FIG. 11 the perforated mats 14 are mounted below and the unperforated pressure mats 13 above. While the unperforated mat 13 acts as transport and pressure mat in the arrangement shown in FIG. 10, the perforated mat 14 discharges, for example, dust particles of a fraction determined by the size of its sieve holes into an underpressure container, with an excellent interaction of the underpressure maintained in the collecting container and the pressure developed during the tensioning of mats 13, 14. In the arrangement according to FIG. 11, on the other hand, with the perforated mat mounted at the bottom and under the effect of gravity, the material to be treated is transported and subjected to three separate effects, namely, to the pressure exerted by the unperforated mat 13, to gravity, and to a suction effect due to underpressure in the container 24.

FIG. 13 shows two adjacent zones, the perforated mat being mounted below in one zone and above in the other zone. This arrangement is particularly advantageous whenever various materials are to be treated simultaneously in a single device.

The invention is not limited to the examples described above; thus, the device according to the invention can be used, for instance, for the efficient dewatering of wet goods.

I claim:

1. A device for sieving, sorting, filtering and the like, said device extending in an inclined manner between a material feed and a material discharge and having a plurality of parallel spaced carriers, means comprising swinging levers and driving rods associated with said carriers and causing said carriers to carry out swinging movements such that the carriers move 180° out of phase with each other, said carriers forming at least two systems extending in a longitudinal direction which is the transporting direction of the material, the movements of carriers of systems located next to each other forming slots of continuously changing width, and at least one mat set covering said slots and fastened to adjacent carriers of two systems, said mat set consisting of at least two spaced and superposed mats, at least one of the mats comprised in a mat set being a perforated mat and at least one mat being an unperforated mat, wherein due to the relative motion of the carriers each mat set forms a sorting zone with a channel-shaped or hose-shaped sorting surface of continuously changing cross-section extending in the longitudinal direction of the carriers, wherein in the closest distance position of the carriers defining one sorting zone one of the two mats has a concave sag and the other of the two mats has simultaneously a convex arching, whereas in the largest distance position of carriers both mats are tightly tensioned, overstretched and parallel relatively to each other, and wherein the transport of the material is effected by the concerted action of the inclined arrangement of the device and the relative motion of the carriers along with the tensioning and release of the mats, whereby said unperforated mats serve as pressure or rebound mats.

2. A device in accordance with claim 1, comprising at least two sorting zones arranged next to each other and in a common plane and formed in the direction of the longitudinal stretch of carriers, each of said sorting zones consisting of two superposed mats, said mats being fastened jointly to carriers which define a sorting zone and forming, due to the relative motion of said carriers, a hose-shaped sorting surface with continuously changing cross section, wherein the top mat is pre-shaped or pre-tensioned in such a way that in the largest distance position of the carriers which define a sorting zone said top mat has a convex arching, whereas the bottom mat has simultaneously a tightly tensioned, momentarily overstretched, rectilinear position.

3. A device in accordance with claim 1, comprising at least two sorting zones arranged next to each other and in a common plane and extending in the direction of the longitudinal stretch of said carriers, each individual sorting zone comprising at least two mats and intermediate pieces spacing said mats, said mats having sieve holes of different size relative to each other and being fastened jointly to carriers of both systems (I, II) which define a sorting zone, whereby in the closest distance position of carriers moved relatively to each other a sorting zone is defined, the mats fastened to said carriers having a unidirected, concave sag, and in the largest distance position of said carriers forming a tightly tensioned, momentarily overstretched, parallel position relative to each other, and wherein the backside of the perforated mats serves as pressure or rebound surface for the particles of material tossed-up during the tensioning of the mat arranged underneath.

4. A device in accordance with claim 3, having a cover frame, the function of a pressure or rebound surface for the particles of material tossed up during the tensioning of the uppermost mat of a sorting zone being assumed by said cover frame, said cover frame being arranged spaced above the uppermost mat of a sorting zone and made up of individual sections.

5. A device in accordance with claim 4, wherein each individual sorting zone comprises three mats, and intermediate pieces spacing said mats relatively to each other, said mats including a lowermost mat, an uppermost mat with equal sieve holes and a central mat with an unperforated blind bottom, said central mat transporting the material passed through towards the discharge end and serving at the same time with its backside as pressure or rebound surface for the particles of material tossed up during the tensioning of bottom mat, wherein said top mat and said bottom mat are charged simultaneously with two identical sieving, sorting or filtering materials, while at the discharge end of each individual sorting zone four fractions are obtained, two of said fractions being always similar.

6. A device in accordance with claim 4, wherein each individual sorting zone comprises three mats, intermediate pieces spacing said mats relatively to each other, said mats including two bottom mats with sieve holes of different size and an uppermost mat which is unperforated, and wherein the material to be treated is introduced on the charging side of each individual sorting zone into the space formed by mats in such a way that a dust-free sieving or sorting of dusty goods is made possible through the dustproof sealing of the sorting zone by means of said unperforated mat.

7. A device in accordance with claim 5, said device comprising at least two sorting zones arranged next to each other and in a common plane and formed in the direction of the longitudinal stretch of carriers, wherein each of said sorting zones comprises at least one perforated mat fastened to the carriers of systems which define a sorting zone, and comprising smooth and plain rubber or plastic covers fastened for lateral sealing purposes to the side walls of the device and to adjacent carriers in such a way that the rubber or plastic covers do not hinder the relative motion of carriers.

* * * * *